（12）United States Patent
Kim et al.

(10) Patent No.: US 10,320,853 B2
(45) Date of Patent: Jun. 11, 2019

(54) METHOD AND APPARATUS FOR SUPPORTING FACILITY CONTROL OF TERMINAL

(71) Applicant: Samsung Electronics Co., Ltd., Suwon-si, Gyeonggi-do (KR)

(72) Inventors: Daedong Kim, Seongnam-si (KR); Keuncheol Lee, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 14/974,520

(22) Filed: Dec. 18, 2015

(65) Prior Publication Data
US 2016/0182574 A1  Jun. 23, 2016

(30) Foreign Application Priority Data

Dec. 18, 2014  (KR) .................. 10-2014-0183493

(51) Int. Cl.
*G08B 19/00* (2006.01)
*H04L 29/06* (2006.01)
(Continued)

(52) U.S. Cl.
CPC .......... *H04L 65/1069* (2013.01); *G08C 17/02* (2013.01); *G08C 23/04* (2013.01);
(Continued)

(58) Field of Classification Search
CPC ........ G08C 23/04; G08C 17/02; G08C 21/00; G08C 2201/91; G08C 2201/93; G08C 17/00; G08C 2201/31; G08C 2201/51; H04M 1/72533; H04M 1/7253; H04M 1/2755; H04M 1/72525; G01S 5/0247;
(Continued)

(56) References Cited

U.S. PATENT DOCUMENTS 6,647,548 B1 * 11/2003 Lu .......................... H04H 60/37
725/13
6,838,671 B2  1/2005 Compana et al.
(Continued)

FOREIGN PATENT DOCUMENTS

EP          2242208 A2    10/2010
WO     2014-092503 A1     6/2014

*Primary Examiner* — Daniel Previl
(74) *Attorney, Agent, or Firm* — Jefferson IP Law, LLP

(57) ABSTRACT

A method and an apparatus for supporting facility control of a terminal are provided. The method includes a sensor device receiving facility-related information from a remote control device of a facility to which the sensor device is attached, driving at least one sensor in accordance with the facility-related information, determining a kind of the facility based on a result of detecting through the at least one driven sensor, and transmitting a registration request for the facility of which the kind has been determined to a gateway. The present disclosure relates to a sensor network, Machine Type Communication (MTC), Machine-to-Machine (M2M) communication, and technology for Internet of Things (IoT). The present disclosure may be applied to intelligent services based on the above technologies, such as a smart home, a smart building, a smart city, a smart car, a connected car, health care, digital education, smart retail, security and safety services.

14 Claims, 11 Drawing Sheets

(51) Int. Cl.
*G08C 17/02* (2006.01)
*G08C 23/04* (2006.01)
*H04L 12/64* (2006.01)
*H04L 29/08* (2006.01)

(52) U.S. Cl.
CPC ........ *H04L 12/6418* (2013.01); *H04L 65/102* (2013.01); *H04L 65/1073* (2013.01); *H04L 67/12* (2013.01)

(58) Field of Classification Search
CPC ..... H04W 4/001; H04W 4/023; H04W 4/025; H04W 4/043; G06F 3/0346; G06F 3/0362; G06F 3/0482; G06F 3/0485; G06F 3/0488; G06F 3/167; G06F 17/30876; G06F 2203/0331; G06F 3/014; G06F 3/017; G06F 3/0338; G09G 2310/065; G09G 2320/0257; G09G 3/003; G09G 3/28; G10L 15/22; G10L 15/30; G10L 17/22; G10L 2015/223; H04N 13/0438; H04N 13/0497; H04N 2005/4432; H04N 21/233; H04N 21/25808; H04N 21/4131; H04N 21/422; H04N 21/42202; H04N 21/42203; H04N 21/42204; H04N 21/42206; H04N 21/4222; H04N 21/42222; H04N 21/4312; H04N 21/43615; H04N 21/4394; H04N 21/4821; H04N 21/4882; H04N 21/654; H04N 21/6582; H04N 2213/008; H04N 21/472; H04N 5/44543; H04N 5/46; H04N 5/60; H04N 7/16; H04N 1/00129; H04N 1/195; H04N 1/19594; H04N 1/393; H04N 21/4104; H04N 21/47214; H04N 21/488; H04N 2201/043; H04N 2201/0436; H04N 5/44504; H04N 5/44582; H04N 7/10; H04N 7/106; H04N 7/17318; H04N 7/17336; A61L 9/22; F24F 11/0012; F24F 11/0015; F24F 11/0017; F24F 2003/1682; F24F 3/166; H02H 3/08; H04H 60/32; H04H 60/43; H05B 37/03; Y02B 30/78; G03B 17/38; G03B 27/6207

USPC ....... 340/501, 506, 614, 531, 611, 500, 612, 340/515, 517, 539.14, 539.22, 340/539.23–539.29, 540, 12.5, 539.17, 340/539.26, 555, 825.29, 5.2, 5.86
See application file for complete search history.

(56) References Cited

U.S. PATENT DOCUMENTS

| | | | |
|---|---|---|---|
| 6,899,103 B1 | 5/2005 | Hood et al. | |
| 7,047,054 B2 | 5/2006 | Benni | |
| 7,313,427 B2 | 12/2007 | Benni | |
| 7,666,568 B2 | 2/2010 | Gao et al. | |
| 7,675,248 B2 | 3/2010 | Mubaslat et al. | |
| 7,706,853 B2 | 4/2010 | Hacker et al. | |
| 7,957,131 B1 | 6/2011 | Mongia et al. | |
| 8,692,484 B2 | 4/2014 | Weng | |
| 8,711,092 B2 | 4/2014 | Soh et al. | |
| 2003/0100962 A1* | 5/2003 | Sumita | H04L 12/2803 700/65 |
| 2005/0159823 A1* | 7/2005 | Hayes | G05B 15/02 700/19 |
| 2006/0168236 A1 | 7/2006 | Higuma et al. | |
| 2007/0242235 A1 | 10/2007 | Ohno | |
| 2009/0059603 A1* | 3/2009 | Recker | H05B 37/0272 362/362 |
| 2011/0149509 A1 | 6/2011 | Mongia et al. | |
| 2012/0057321 A1 | 3/2012 | Jung | |
| 2013/0002147 A1 | 1/2013 | Lagutko | |
| 2013/0237272 A1 | 9/2013 | Prasad | |
| 2014/0022462 A1 | 1/2014 | Arling et al. | |
| 2014/0046848 A1* | 2/2014 | Radu | G06Q 20/40 705/44 |
| 2014/0128032 A1 | 5/2014 | Muthukumar | |
| 2014/0129006 A1* | 5/2014 | Chen | G05B 15/02 700/90 |
| 2014/0139117 A1 | 5/2014 | Choe | |
| 2014/0167929 A1* | 6/2014 | Shim | G08C 17/02 340/12.5 |
| 2014/0201072 A1* | 7/2014 | Reeser | G06Q 30/04 705/40 |
| 2014/0250183 A1* | 9/2014 | Unagami | H04M 3/5166 709/204 |

* cited by examiner

FIG. 6

| Classification | Temperature | Humidity | Illumination | Acoustic | Gas |
|---|---|---|---|---|---|
| Air conditioner | O (0.4) | O (0.3) | X | O (0.3) | X |
| TV | O (0.4) | X | O (0.3) | O (0.4) | X |
| Set-top box | O (0.6) | X | X | O (0.5) | X |
| Audio device | O (0.6) | X | X | O (0.7) | X |
| Lamp | O (0.4) | X | O (0.8) | X | X |

FIG. 7B

| Classification | Public | Private | Remarks |
|---|---|---|---|
| Service1<br>"living room lamp control" | O | O | |
| Service2<br>"living room TV control" | O | O | |
| Service3<br>"bed room lamp control" | X | O | |

METHOD AND APPARATUS FOR SUPPORTING FACILITY CONTROL OF TERMINAL

CROSS-REFERENCE TO RELATED APPLICATION(S)

This application claims the benefit under 35 U.S.C. § 119(a) of a Korean patent application filed on Dec. 18, 2014 in the Korean Intellectual Property Office and assigned Serial number 10-2014-0183493, the entire disclosure of which is hereby incorporated by reference.

TECHNICAL FIELD

The present disclosure relates to a method and an apparatus for supporting facility control of a terminal. More particularly, the present disclosure relates to a method and an apparatus for supporting facility control of a terminal, in which a sensor device that is registered in a gateway determines the kind of a facility and registers the facility in the gateway, and a terminal is supported to control the registered facility.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "detecting technology", "wired/wireless communication and network infrastructure", "service interface technology", and "Security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including a smart home, a smart building, a smart city, a smart car or a connected cars, a smart grid, health care, smart appliances and advanced medical services through convergence and combination between existing information technology (IT) and various industrial applications.

On the other hand, with the development of semiconductor technology and wireless communication technology, a mobile device, such as a smart phone, has changed many domains of our lives. For example, it becomes possible to use a service to remotely control facility operations using the smart phone.

However, in order to remotely control the facility operations using the smart phone, it is required to replace the existing facility by a smart facility that is compatible to receive the control of the smart phone, and this may cause a great cost and inconvenience to a user.

Therefore, a need exists for a method and an apparatus, in which a sensor device is introduced to the existing facility to determine the kind of the facility and to register the facility in a gateway so that the existing facility can be controlled by a terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus, in which a sensor device is introduced to the existing facility to determine the kind of the facility and to register the facility in a gateway so that the existing facility can be controlled by a terminal.

In accordance with an aspect of the present disclosure, a method for a sensor device to support facility control of a terminal is provided. The method includes receiving, by the sensor device, facility-related information from a remote control device of a facility to which the sensor device is attached, driving at least one sensor in accordance with the facility-related information, determining a kind of the facility based on a result of detecting through the at least one driven sensor, and transmitting a registration request for the facility of which the kind has been determined to a gateway.

In accordance with another aspect of the present disclosure, a method for a gateway to support facility control of a terminal is provided. The method includes receiving a connection request from a sensor, transmitting a connection completion message if authority information is included in the connection request, receiving a facility registration request from the connected sensor and registering a facility, and receiving a control command of the registered facility from a terminal that includes the authority information, wherein the connection request is transmitted based on a distance between the terminal that is pre-authenticated in a server and the gateway.

In accordance with another aspect of the present disclosure, a sensor device that supports facility control of a terminal is provided. The sensor device includes a communication unit configured to transmit/receive a signal with a gateway and a facility and a control unit configured to control receiving facility-related information from a remote control device of the facility to which the sensor device is attached, driving at least one sensor in accordance with the facility-related information, determining a kind of the facility based on a result of detecting through the at least one driven sensor, and transmitting a registration request for the facility of which the kind has been determined to the gateway.

In accordance with another aspect of the present disclosure, a gateway that supports facility control of a terminal is provided. The gateway includes a communication unit configured to transmit/receive a signal with a sensor device and a server and a control unit configured to control receiving a connection request from a sensor, transmitting a connection completion message if authority information is included in the connection request, receiving a facility registration request from the connected sensor and registering a facility, and receiving a control command of the registered facility from a terminal that includes the authority information, wherein the connection request is transmitted based on a distance between the terminal that is pre-authenticated in the server and the gateway.

According to the aspects of the present disclosure, the method and the apparatus for supporting facility control of a terminal can control the existing facility using the terminal without separate facility replacement, and the terminal can remotely control the facility that is registered in the gateway. Further, necessary communications can be performed between the facilities through configuration of a network between the facilities, and thus a user can effectively control the facility.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a diagram illustrating a determination table that is referred to for determination of a kind of facility using an individual sensor in a sensor device according to an embodiment of the present disclosure;

FIGS. 7A and 7B are diagrams illustrating a process of receiving authority information for terminal non-registration control and illustrating a facility list according to various embodiments of the present disclosure;

Throughout the drawings, it should be noted that like reference numbers are used to depict the same or similar elements, features, and structures.

DETAILED DESCRIPTION

Figure 1:
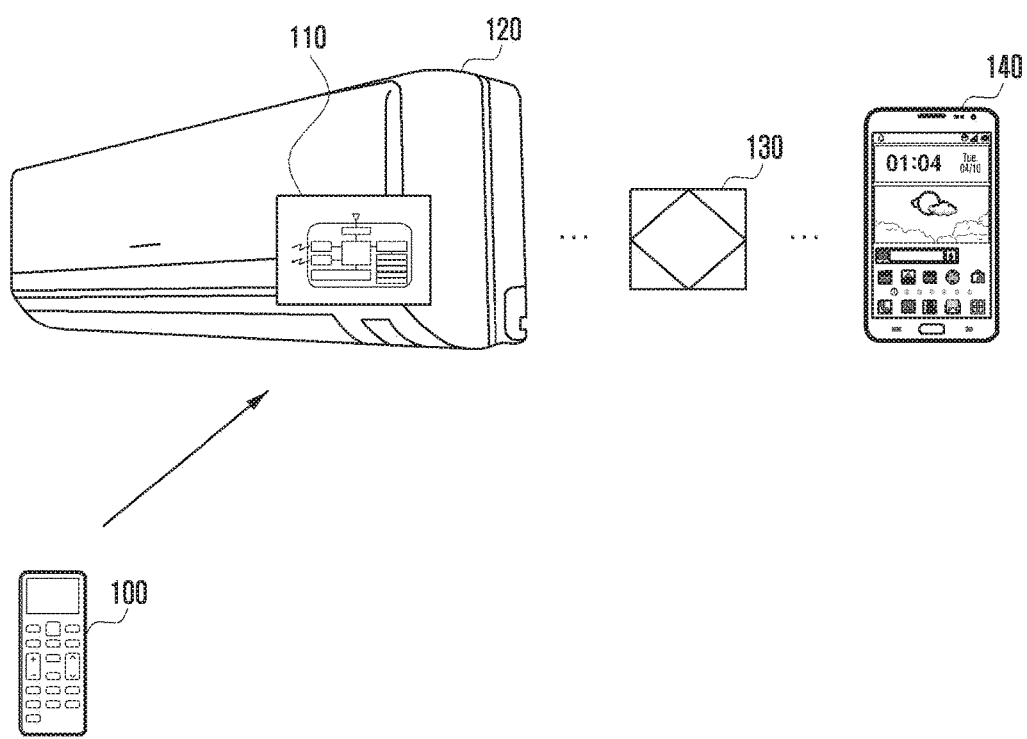
FIG. 1 is a diagram illustrating a whole configuration of a system that supports facility control of a terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, only portions that are necessary to understand the operation according to various embodiments of the present disclosure will be explained, and explanation of other portions will be simplified or omitted to avoid obscuring the subject matter of the present disclosure.

The features of the present disclosure are not limited to the above-described examples, but may include shape modifications or additional functions of the respective constituent elements to be described hereinafter. In the drawings, sizes and relative sizes of some constituent elements may be exaggerated for clarity in explanation.

The aspects and features of the present disclosure and methods for achieving the aspects and features will be apparent by referring to the various embodiments to be described with reference to the accompanying drawings. However, the present disclosure is not limited to the various embodiments disclosed hereinafter, but can be implemented in diverse forms. The matters defined in the description, such as the construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

The present disclosure will be described herein with reference to the accompanying drawings illustrating block diagrams and flowcharts for explaining a method and an apparatus for supporting facility control of a terminal according to various embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or a non-transitory computer-readable memory that can direct a computer or other programmable data processing apparatus to function in a particular manner, such that the instructions stored in the computer usable or a non-transitory computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in an embodiment of the present disclosure, means, but is not limited to, a software or hardware component, such as a field programmable gate array (FPGA) or application specific integrated circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

The term "facility-related information" includes information related to the facility characteristics that a sensor device receives from a remote control device of a facility. For example, the facility-related information may include information about the kind of the facility and a manufacturer of the facility. Further, the facility-related information may include information on whether the facility is of a fixed type or a movable type.

In an embodiment of the present disclosure, the term "authority information" is information that indicates whether at least one sensor or a terminal has an authority to register itself in a system. In the case where the sensor or the terminal requests authentication from a server, the server may determine whether to permit registration of the sensor or the terminal. If the server determines to permit the registration of the sensor or the terminal, the server may transmit authority information, and in accompaniment to the transmitted authority information, the sensor or the terminal may request registration from a gateway.

FIG. 1 is a diagram illustrating a whole configuration of a system that supports facility control of a terminal according to an embodiment of the present disclosure.

Referring to FIG. 1, a system that supports facility control of a terminal may include a facility remote control device 100, a sensor device 110, a facility 120, a gateway 130, and a terminal 140.

The facility remote control device 100 may be a device that remotely controls the facility, such as a television (TV), an air conditioner, or an audio appliance. The facility remote control device 100 may include buttons provided on the outside thereof to control various kinds of functions. If a signal is received from a user through the button, the facility remote control device 100 may transmit an infrared ray (IR) signal to the above-described electronic appliance in order to transfer the received signal to the electronic appliance. In order to transmit a control signal to a specific facility, the facility remote control device 100 may transmit the facility-related information that is included in the IR signal.

In an embodiment of the present disclosure, the sensor device 110 may be attached to the facility and support facility control of a terminal. The sensor device 110 can transmit/receive the IR signal with at least one of the facility remote control device 100 and the facility 120. Further, the sensor device 110 may include at least one sensor. The sensor device 110 may include at least one of a temperature sensor, a humidity sensor, an illumination sensor, a proximity vibration detecting sensor, and a magnetic sensor. The sensor device 110 may detect whether the facility is driven through at least one sensor included therein.

Further, the sensor device 110 may transmit/receive a signal through wireless communications with the terminal 140. The wireless communication may concretely include Bluetooth, WI-FI, WI-FI-Direct, and near field communication (NFC). Further, the sensor device 110 may transmit/receive a signal with another sensor device through the wireless communication.

The facility 120 may be a general electronic appliance. The facility 120 may include a TV, an audio appliance, an air conditioner, or a lamp. The facility 120 may be controlled by an IR signal that is provided from the facility remote control device 100. Further, the facility 120 may be controlled through the terminal 140 to which the sensor device 110 is attached. The facility 120 may be controlled by the IR signal that is provided from the sensor device 110.

The gateway 130 may enable the sensor device 110 attached to the facility 120 and the terminal 140 connected to a mobile communication network to communicate with each other. As described above, a communication module provided in the sensor device 110 may be a Bluetooth, WI-FI, or Zigbee module, and in order to perform communication between the terminal 140 and the facility 120, they are required to be connected to the mobile communication network. In this case, the mobile communication network may include a 3rd generation (3G) network and a 4th generation (4G) network. Accordingly, the gateway 130 may include a communication module that can communicate with the sensor device 110 and a communication unit that can communicate with the mobile communication network in which the terminal is included. Through the above-described gateway 130, a user can control the facility 120 in a certain area using the terminal 140 that is connected to the mobile communication network.

The terminal 140 may be connected to the mobile communication network, and may control the facility 120 through the sensor device 110 attached to the facility 120. The terminal 140 may include a general smart phone or a wearable device. The terminal 140 may receive device authentication from a server (not illustrated in the drawing) of the system.

Figure 2:
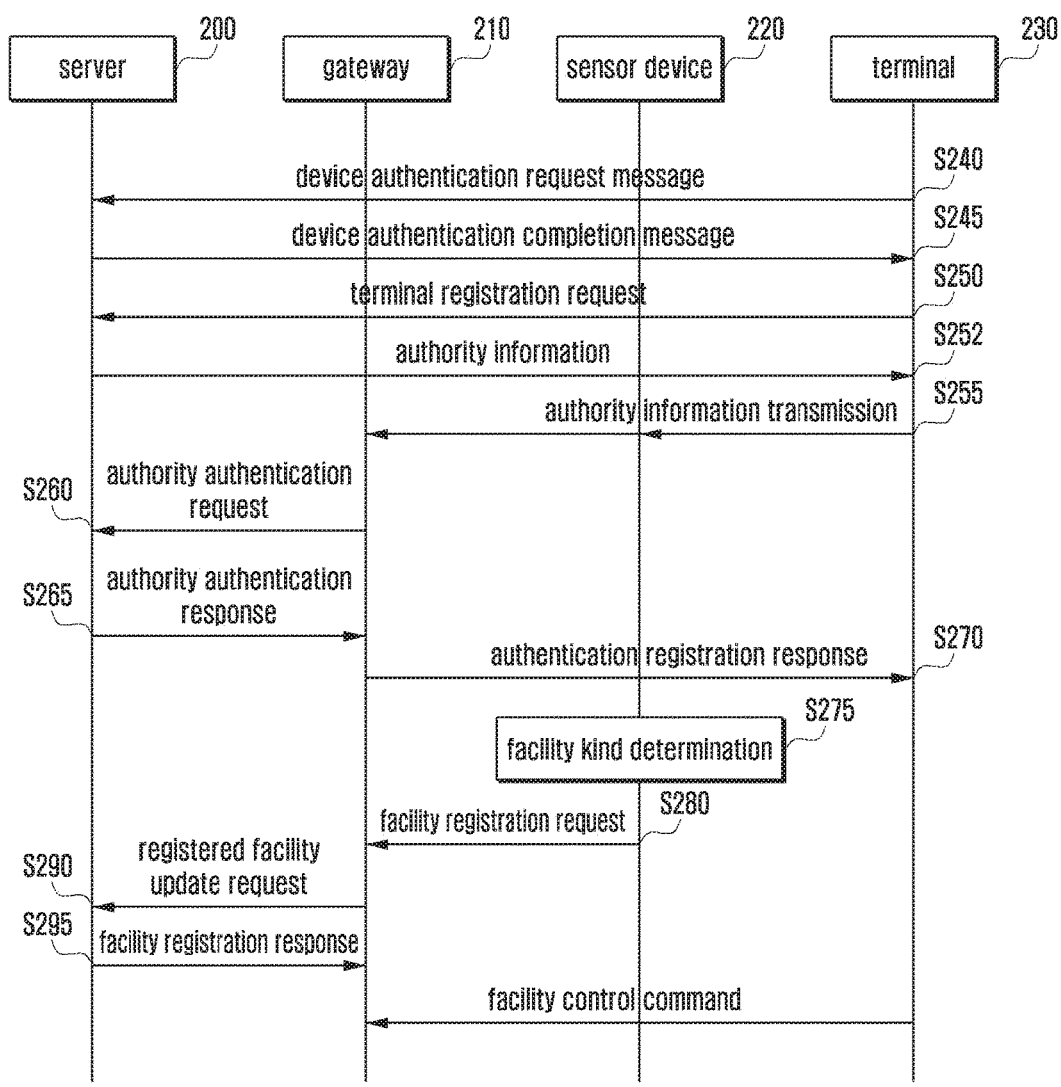
FIG. 2 is a diagram illustrating a process of supporting facility control of a terminal for each node according to an embodiment of the present disclosure.

FIG. 2 is a diagram illustrating a process of supporting facility control of a terminal for each node according to an embodiment of the present disclosure.

Referring to FIG. 2, at operation S240, a terminal 230 may transmit a device authentication request message to a server 200.

At operation S245, the server 200 may transmit an authentication completion message to the terminal 230 in response to the device authentication request message received from the terminal 230. The server 200 may determine whether to permit registration of the terminal 230 using user account information of the terminal 230 included in the authentication request message that is transmitted from the terminal 230. User account information about terminals of which the registration has been permitted by a service provider may be pre-stored in the server 200. For example, the user account information of the terminal 230 included in the authentication request message and service provider account information stored by the service provider may be compared with each other. In the case where the server 200 has decided to permit the registration of the terminal 230, the server 200 may generate the authentication completion message as described above.

At operation S250, the terminal 230 may transmit a terminal registration request to the server 200. The terminal 230 may transmit a signal that includes the terminal registration request and a terminal identification (ID). In response to the terminal registration request, the server 200 may determine whether to permit the terminal registration based on the determination of whether the terminal 230 is an authenticated terminal.

At operation S252, the server 200 may transmit authority information in the case where the terminal registration has been permitted. In an embodiment of the present disclosure, the term "authority information" is information indicating whether at least one sensor or terminal has an authority to perform registration in the system. The authority information may include an encrypted code. The authority information may be transmitted to the terminal and may be used in an authentication process through a gateway.

Thereafter, at operation S255, the terminal 230 that has completed the registration in the server 200 may transmit the authority information to a sensor device 220 and a gateway 210 in order to register the sensor device 220 in the gateway 210.

At operation S260, the gateway 210 requests the server 200 to perform authority authentication with respect to the terminal 230 with the authority information that is received from the terminal 230.

At operation S265, the server 200 performs the authority authentication through confirming of the authority information that is transmitted from the gateway 210, and transmits a response message. The authority authentication includes determination of whether the authority information that is transmitted from the terminal 230 corresponds to the authority information that is generated by the server 200 and transmitted to the terminal 230. If an authority authentication response message is received, the gateway 210, at operation S270, transmits a response message to the authentication registration to the terminal 230.

At operation S275, the sensor device 220 may determine the kind of a facility to which the sensor device 220 is attached. The operation S275 will be described later with reference to FIG. 5.

At operation S280, the sensor device 220 may request the gateway 210 to perform registration of the facility of which the kind has been determined. In the case of requesting the registration of the facility, the sensor device 220 may also transmit facility-related information of the facility.

At operation S290, the gateway 210 may request the server 200 to update a registered facility list. In the case of updating the facility in the registered facility list, the server 200, at operation S295, may transmit a corresponding response message. After completion of the above-described process, the terminal 230 may control the facility.

Figure 3:
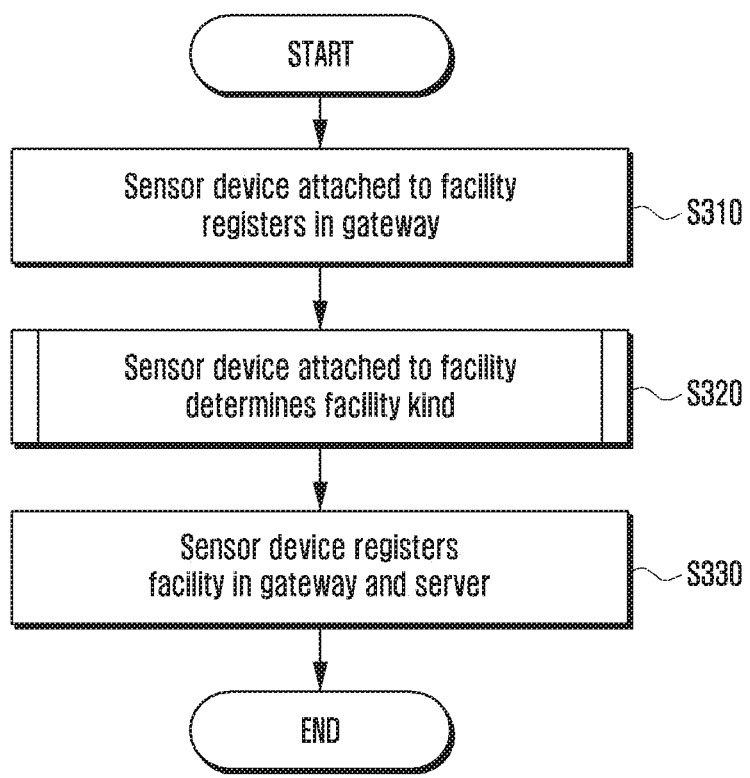
FIG. 3 is a diagram illustrating a process in which a sensor device supports facility control of a terminal according to an embodiment of the present disclosure.

FIG. 3 is a diagram illustrating a process in which a sensor device supports facility control of a terminal according to an embodiment of the present disclosure.

Referring to FIG. 3, at operation S310, the sensor device that is attached to the facility may be registered in the gateway. In this case, the authority information may be used as a basis to determine whether the sensor device can be registered in the gateway. The term "authority information" is information indicating whether at least one sensor device or terminal has an authority to perform registration in the system. For example, registration of the sensor device in the gateway means that the sensor device receives the authority information. Reception of the authority information through the sensor device is performed in two methods as follows.

Method 1 in which the sensor device receives the authority information: The sensor device may receive the authority information from a terminal that has been authenticated by the sever and has received the authority information.

Method 2 in which the sensor device receives the authority information: The sensor device may be directly authenticated by the server and receive the authentication information from the server through the gateway.

In the case of the method 1 in which the sensor device receives the information, the sensor device may receive the authentication information that is transmitted from the terminal, and in the case of passing through the authentication information through the authority information in the gateway, the sensor device may also be registered in the gateway. Further, in the case of the method 2 in which the sensor device receives the authority information, the sensor device may be directly authenticated by the server without intervention of the terminal, and transmit a registration request to the server through the gateway. The server may determine that the sensor device is a device that has passed through device authentication in response to the registration request, and in this case, the server may generate and transmit permitted authority information to the gateway. The sensor device may receive the authority information from the gateway. The terminal may determine whether a distance between the terminal and the gateway is shorter than a distance between the sensor device and the gateway, and if the terminal has entered into a certain area around the gateway, the terminal may selectively use the method 1 in which the sensor device receives the authority information.

The sensor device can access the gateway with the authority information that is received as described above, and this means that the sensor device has been registered in the gateway. Through the registration in the gateway, the sensor device can communicate with a terminal that is included in an external mobile communication network having another communication module. Further, the sensor device can be registered in the server of the system through the gateway.

Hereinafter, a case that adopts the method 1 in which the sensor device receives the authority information will be described with reference to FIG. 4.

Figure 4:
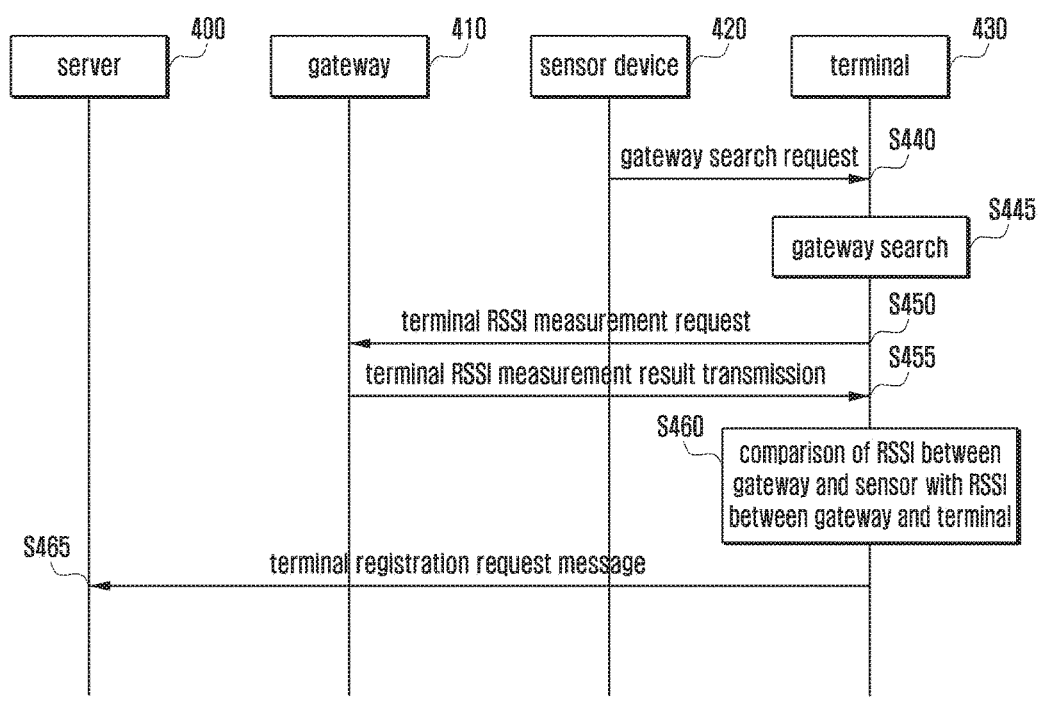
FIG. 4 is a diagram illustrating a process in which a terminal transmits a terminal registration request message to a server according to an embodiment of the present disclosure.

FIG. 4 is a diagram illustrating a process in which a terminal transmits a terminal registration request message to a server according to an embodiment of the present disclosure.

Referring to FIG. 4, more specifically, in order to transmit the authority information to the sensor device, a terminal 430 is required to receive the authority information from the server, and the terminal 430 transmits a terminal registration request message to server 400 so that the terminal 430 can receive the authority information. First, the terminal 430 that can transmit the authority information to a sensor device 420 may include a terminal that has passed through a device authentication process through the server. If the terminal 430 approaches a gateway 410 within a certain distance to transmit a registration request, the terminal 430 may automatically enter into a registration mode. The certain distance may include a distance between the sensor device 420 and the gateway 410. Hereinafter, explanation will be made under the assumption that the distance that becomes the basis is a distance between the sensor device 420 and the gateway 410.

First, the sensor device 420 transmits a gateway search request to the terminal 430. The gateway search request may be transmitted using a beacon signal. At operation S445, the terminal 430 may search the gateway 410. The terminal 430 may search the gateway 410 through the connected mobile communication network. In the case where the search is completed, at operation S450, the terminal 430 may request the gateway 410 to measure a received signal strength indication (RSSI) for the terminal 430. At operation 455, the gateway 410 may transmit the RSSI measurement result for the terminal in response to the request. At operation S460, the terminal 430 may determine whether the RSSI between the terminal 430 and the gate way 410 is stronger than the RSSI between the sensor device 420 and the gateway 410 through comparison of the RSSI between the sensor device 420 and the gateway 410 with the RSSI between the terminal 430 and the gateway 410. The terminal 430 may receive the RSSI information between the sensor device 420 and the gateway 410, which is included in a gateway search request message that is transmitted from the sensor device 420 to the terminal 430 at operation S440. If the RSSI between the terminal 430 and the gate way 410 is stronger than the RSSI between the sensor device 420 and the gateway 410 as the result of the comparison, the terminal 430 may transmit the terminal registration request message to the server 400 at operation S465. The terminal registration request message may include information on the terminal ID.

Through the above-described process, in the related art, a user should directly register the terminal with respect to a communication node to cause inconvenience in use. However, according to an embodiment of the present disclosure, the terminal detects its entrance into a certain area and transmits a terminal registration request to increase user convenience.

After the sensor device that is attached to the facility registers the facility in the gateway at operation S310, the sensor device may determine the kind of the facility at operation S320. For example, in order to register the facility in the gateway as a method for supporting control of the terminal, the sensor device may determine the kind of the facility. Determination of the kind of the facility is performed in two methods as follows.

Method 1 in which the sensor device determines the kind of the facility: The sensor device may determine the facility by successively transmitting IR signals of facilities that are pre-stored to the facility and detecting change elements when the facility operates.

Method 2 in which the sensor device determines the kind of the facility: The sensor device may determine the facility by driving a sensor based on an IR signal that is received from a remote control device of the facility.

The method 1 in which the sensor device determines the kind of the facility may determine the kind of the facility by transmitting IR signals for respective kinds of facilities through an IR transmission device in the sensor device and detecting changes that may occur when the facility that has received the IR signal operates through sensors in the sensor device. Further, the method 2 in which the sensor device determines the kind of the facility may be used to determine the kind of the facility by driving only corresponding sensors in the sensor device based on signals received from the remote control device of the facility.

Hereinafter, the method 2 in which the sensor device determines the kind of the facility will be described with reference to FIG. 5. Further, a method in which the sensor device that is used in the above-described methods 1 and 2 will be described with reference to FIG. 6.

Figure 5:
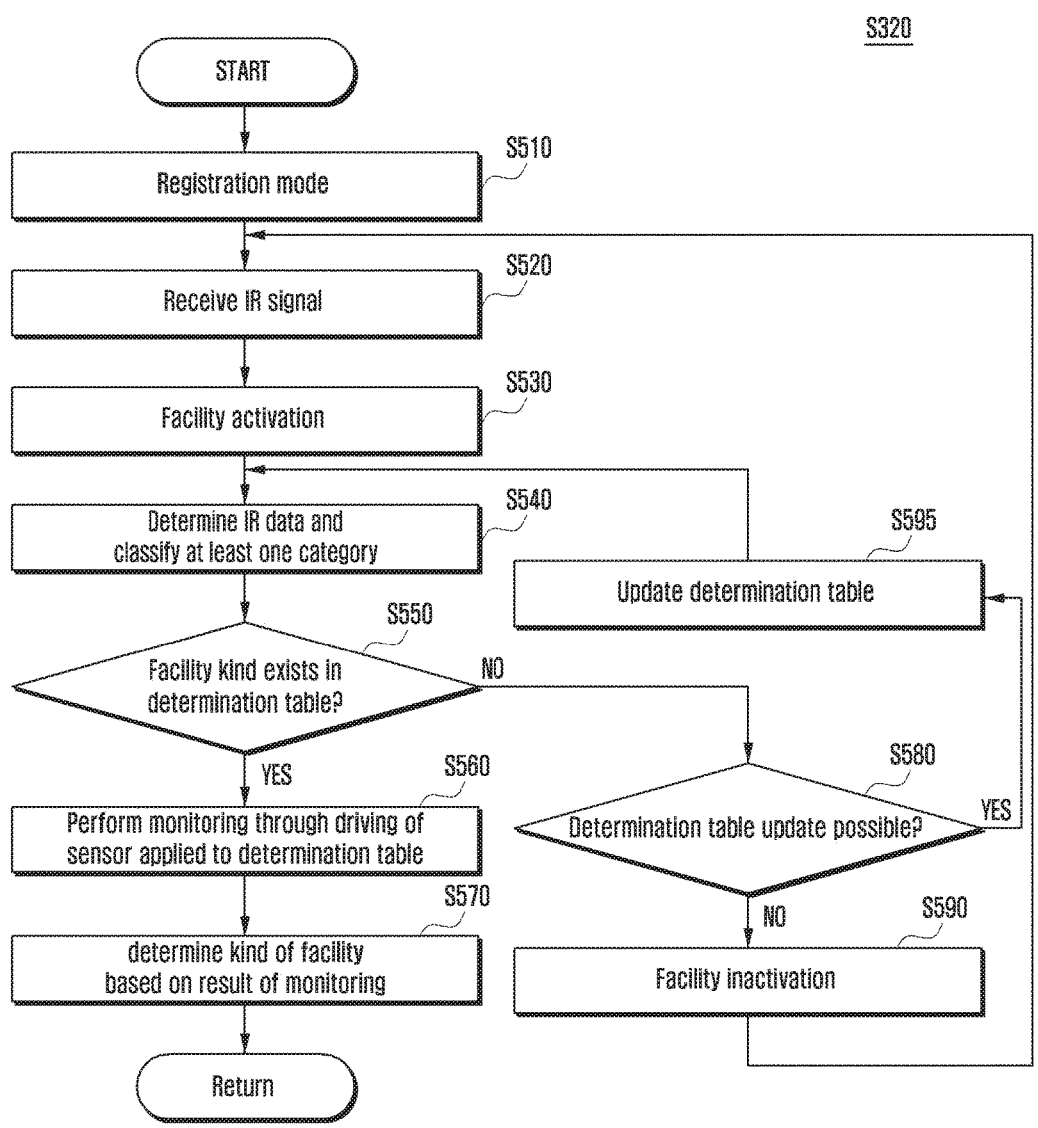
FIG. 5 is a diagram illustrating a process in which a sensor device determines a facility according to an embodiment of the present disclosure.

FIG. 5 is a diagram illustrating a process in which a sensor device determines a facility according to an embodiment of the present disclosure.

Referring to FIG. 5, at operation S510, the sensor device may be switched to a registration mode. Further, at operation S520, the sensor device may receive an IR signal from the remote control device of the facility. Further, at operation S530, the sensor device may activate the facility. Further, at operation 540, the sensor device may classify at least one kind of facility through determination of the received IR signal. The IR signal may include facility-related information. The facility-related information includes information related to the characteristics of the facility that is received from the remote control device of the facility. For example, the facility-related information may include information about the kind of the facility and a manufacturer of the facility. Further, the facility-related information may include information on whether the facility is of a fixed type or a movable type. Further, a user may approach the sensor device within a proximity distance and may designate a target sensor device.

Further, the sensor device performs determination procedure through sensors included therein to confirm the determination of the kind of the facility through the IR signal. At operation S550, the sensor device may determine whether the classified kind of the facility is included in a facility determination table that the sensor device possesses. If the classified kind of the facility is included in the facility determination table that the sensor device possesses at operation S550, the sensor device, at operation S560, may drive the sensors based on the determination table to perform monitoring. At operation S570, the sensor device may determine the kind of the facility based on the result of the monitoring.

Further, if it is determined that the classified kind of the facility is not included in the facility determination table that the sensor device possesses at operation S550, the sensor device, at operation S580, may determine whether the determination table can be updated. If it is determined that the determination table cannot be updated at operation S580, the sensor device may inactivate the facility at operation S590, and wait for until the IR signal is received at operation S520. Further, if it is determined that the determination table can be updated at operation S580, the sensor device may perform the update at operation S595, and return to operation S540.

The update of the determination table may be performed with information that is received from an external server through the gateway in which the sensor device is registered. For example, in the case where the sensor device requests the gateway to update the determination table, the gateway may receive information on the sensor to be driven by the external server based on the facility-related information of the IR signal. The received information may be stored in the existing determination table to be updated.

In addition to determination of the kind of the facility through the IR signal, the sensor device may use the determination table to perform determination using the sensors. An example of the determination table is illustrated in FIG. 6. Hereinafter, the determination table will be described below.

FIG. 6 is a diagram illustrating a determination table that is referred to for determination of a kind of facility using an individual sensor in a sensor device according to an embodiment of the present disclosure.

Referring to FIG. 6, the determination table as described above may be pre-stored in the sensor device. In the case where the sensor device is registered in the gateway, the determination table may be received from the server registered in the gateway and the external server to be stored. The determination table may include information on sensors that the sensor device should drive in accordance with various kinds of facilities. Further, the determination table may include weight information on measured values obtained by driving the sensors.

In the method 1 in which the sensor device determines the kind of the facility as described above, the sensor device may transmit a pre-stored IR signal to the facility and may measure things that are changed through the operation of the facility using the determination table. In this case, the kind of the facility may be determined by measuring change amount values through driving all sensors in the sensor device and making the measured values correspond to the table. For example, the sensor device may transmit a certain IR signal to the facility, and the facility may operate through reception of the IR signal. Thereafter, if temperature change, humidity change, and sound change are detected, the sensor device may determine that the kind of the facility is an air conditioner.

Further, in the method 2 in which the sensor device determines the kind of the facility, the use of the determination table will be described below. The sensor device may reconfigure the measured values that are obtained through driving of the sensors based on the determination table as in Equation 1 below.

$$V = \Sigma(E \times W) \quad \text{Equation 1}$$

V: determination reference value
E: measured change amount per sensor
W: weight value per sensor The measured change amount per sensor may be used in the unit of a percentage in order to represent the change amount value measured by the sensor. For example, Equation 2 below can be derived.

$$E = \frac{v_i - v_t}{v_i} \times 100(\%) \quad \text{Equation 2}$$

$v_i$: initial value
$v_t$: changed value

Based on the above-described change amount and weight value, elements that are changed through selective operation of the facility can be effectively detected, and thus the device determination can be further facilitated. If the resultant value of the "measured change amount per sensor" that is obtained in Equation 1 is larger than a certain threshold value, it becomes possible to determine the kind of the facility.

Hereinafter, in the method 2 in which the sensor device determines the kind of the facility, sensor driving for determining the kinds of a plurality of facilities in the case where the sensor device receives IR signals corresponding to the kinds of the facilities will be described. In this case, it is assumed that several kinds of facilities exist in one space, and two or more IR signals are received. In the case where IR signals for at least two facilities are transmitted, the sensor device determines sensors to be driven with respect to the kinds of facilities in the table. As a result, the driving order of the sensors corresponding to the kinds of facilities is determined in the order of their degree of redundancy.

The degree of redundancy means the degree of duplication of the sensors to be driven for the respective kinds of facilities. Referring to FIG. 6, in the case where the sensor device detects IR signals of an air conditioner, a TV, and an audio device, a temperature sensor, a humidity sensor, and a sound sensor are driven for the air conditioner, the temperature sensor, an illumination sensor, and the sound sensor are driven for the TV, and the temperature sensor and the sound sensor are driven for the audio device. In this case, most frequently duplicate sensors for the kinds of the facilities, that is, the temperature sensor and the sound sensor, are driven. While deriving the determination reference values through multiplication of the successively measured change amounts by the weight values of the respective appliances, the sensor device determines whether there is any facility that exceeds the threshold value. Further, if no signal is detected within a certain time during the detecting operation through successive driving of the sensors, the sensor device may initialize the sensor driving order. By determining the sensor driving order based on the degree of redundancy of the sensors to be driven for the respective kinds of facilities as described above, the kind of facility can be easily and rapidly determined even in a situation that several facilities are in one space and it is difficult to determine the facility.

In the case where the kind of the facility is determined as described above, the sensor device, at operation S330, may register the facility of which the kind is determined in the gateway and the server. When registering the facility in the gateway and the server, the sensor device may transmit the determined kind of the facility together with the facility-related information that is received from the IR signal. The facility-related information includes information related to the characteristic of the facility that is received from the remote control device of the facility. For example, the facility-related information includes information related to the facility characteristics that is received from a remote control device of the facility. For example, the facility-related information may include information about the kind of the facility and a manufacturer of the facility. Further, the facility-related information may include information on whether the facility is of a fixed type or a movable type. The gateway may receive and transfer the above-described information to the server, and the server may register the facility through storing of the received information. In this case, the facility can be discriminated from other facilities by means of registration ID information when the sensor device is registered in the gateway. Through the registration of the facility, a terminal that is included in a mobile communication network may control the facility using the gateway and the sensor device.

Hereinafter, a process in which the gateway determines facilities in a certain area and performs grouping of the facilities will be described. In the case where the sensor device and the facility are registered in the gateway through the above-described process, the sensor device may determine whether the facility is in the same area through detecting of illumination around the facility and perform grouping of the facility. The sensor device that is attached to the facility may determine whether the facility is of a fixed type according to the facility-related information included in the IR signal that is received from the remote control device of the facility. If the facility is of a fixed type, the sensor device may measure the illumination around the facility through driving of an illumination sensor provided in the sensor device. The sensor device transmits the measured illumination value to the gateway in which the sensor device is registered. The gateway may perform grouping of the facilities based on the illumination values that are received from the respective sensors and transmit the grouping information to the server to store the grouping information. Further, the gateway may transmit the grouping information to the sensor device. The sensor device that has received the grouping information may store information on other facilities that are tied into a group together with the facility to which the sensor device is attached.

Hereinafter, non-registration control of a terminal according to an embodiment of the present disclosure will be described. In this embodiment of the present disclosure, if an external user enters into a space where the system is put, the facility that is in a common area may be used in a state where the terminal is not registered in the server. Two non-registration control methods may exist as follows.

Terminal non-registration control method 1: A non-registered terminal receives common authority information from a server and controls a facility in a common area.

Terminal non-registration control method 2: when a non-registered terminal enters into a common area, the gateway detects this and transmits common authority information.

First, since the facilities are registered in the gateway in the system, the gateway stores status information of the facilities. As described above, whether the facility registered in the gateway is a facility of the common area may be determined and stored in the gateway. Further, the setting of the facility may be received by the terminal registered in the gateway that controls the facility. For example, a user may designate a range of the facility that corresponds to the common area through the terminal.

In the terminal non-registration control method 1, if the non-registered terminal has received and stored the common authority information from the server or approaches the facility in the common area with the common authority information, the gateway has recognized the facility in the common area, and thus permits a control with respect to the non-registered terminal. The terminal non-registration control method 2 will be described with reference to FIGS. 7A and 7B.

Figure 7A:
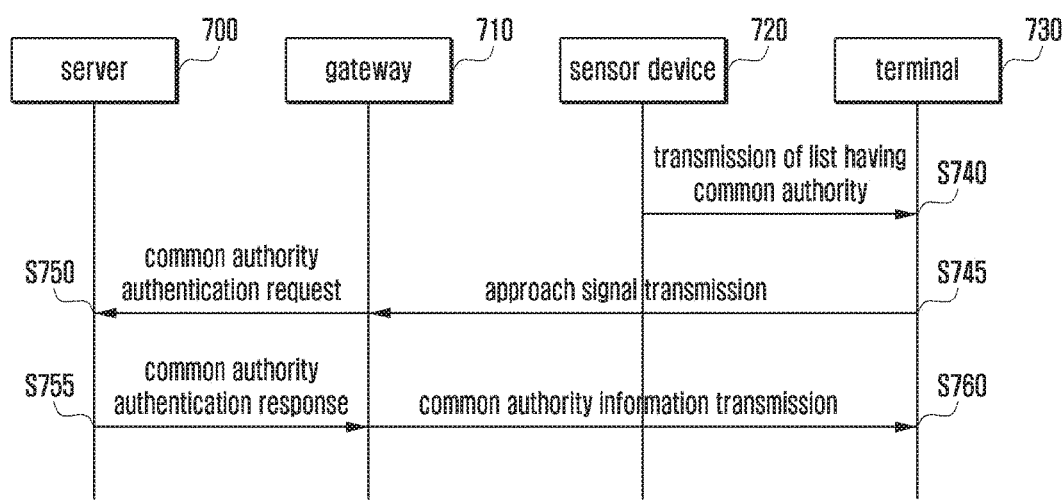

FIGS. 7A and 7B are diagrams illustrating a process of receiving authority information for terminal non-registration control and illustrating a facility list according to various embodiments of the present disclosure.

More specifically, FIG. 7A shows a process for supporting terminal non-registration control for each node, and FIG. 7B shows a service list for the non-registration control.

Referring to FIGS. 7A and 7B, first, at operation S740, a sensor device 720 may transmit a facility list that can be used with a common authority to a terminal 730. This is to let the user know facilities that the user can approach and use without special authority information. Such a facility list is as shown in FIG. 7B. Further, at operation S745, the terminal 730 may transmit an approach signal to a gateway 710. The approach signal may include an approach signal for requesting the gateway to control the facility in the case where the user of the terminal 730 that has received the facility list intends to control the facility. In this case, the gateway determines whether the facility is a facility in the common area through determination of a control signal for the facility included in the approach signal of the terminal.

The determination may include requesting common authority authentication from a server 700 at operation S750 and receiving a common authority authentication response to the authentication request at operation S755. When receiving the common authority authentication response, the gateway 710 may transmit the common authority information to the terminal 730 at operation S760. The terminal 730 may control the facilities in the common area through reception of the common authority information. As described above, with respect to the facilities in the common area, various services that can control the facilities can be provided even to non-registered terminals without special authority authentication.

Figure 8:
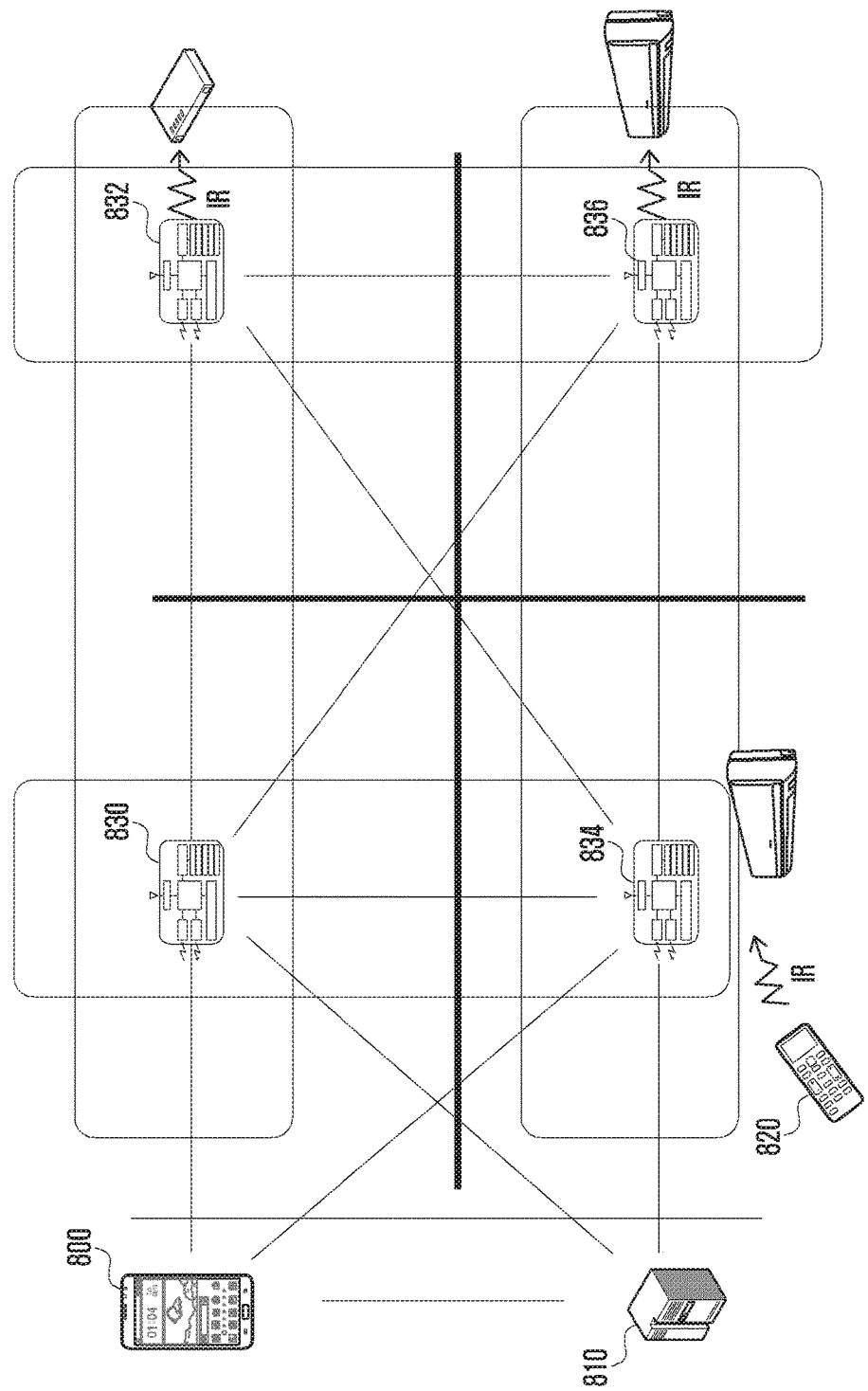
FIG. 8 is a diagram illustrating a communication method between a plurality of sensor devices according to an embodiment of the present disclosure.

FIG. 8 is a diagram illustrating a communication method between a plurality of sensor devices according to an embodiment of the present disclosure.

Referring to FIG. 8, more specifically, a plurality of sensor devices that are registered in a gateway may control facilities in another area. Communication among the plurality of sensor devices may be performed through a terminal 800, a gateway 810, a remote control device 820 of each facility, and a plurality of sensor devices 830, 832, 834, and 836. For example, it is exemplified that facilities in other areas can be controlled from a specific area using the existing remote control device. For example, according to an embodiment of the present disclosure, the plurality of sensor devices are registered in the gateway, and the facilities in other areas can be controlled from the specific area using the existing remote control device. The collective control of the facilities in other areas through control of the facility in the specific area as described above can be set by the terminal.

The sensor devices in the respective areas are registered in the gateway, and can transmit/receive facility-related information of the facilities to which the sensor devices are attached with each other. The respective sensor devices can construct a list of the sensor devices in the respective areas based on the facility-related information received through the communication as described above. Accordingly, the respective sensor devices can construct and use a list of the sensor devices through the above-described communication that operates in real time.

The communication between the sensor devices provided with the list of the sensor devices in the respective areas will be described with reference to FIG. 8. It is assumed that the terminal is set to be able to perform collective control of even the facilities in other areas through the control of the facility in the specific area as described above. In the case where the existing remote control device 820 transmits an IR signal for facility control to the sensor device 834, the sensor device 834 receives the IR signal. If the IR signal is received, the sensor device 834 searches for an area in which the same facility exists based on the list of the sensor devices stored in the sensor device 834. In this case, the sensor device 834 may broadcast the received IR signal. If the sensor devices 830, 832, and 836 receive the IR signal, the sensor devices 830 and 832 confirm the stored list of the sensor devices, and if the corresponding facility does not exist, they do not retransmit the same. Since only the sensor device 836 has the corresponding facility, the sensor device 836 receives the signal and drives the corresponding facility. Here, if it is determined that the sensor devices 830 and 832 are in optimum paths for signal transmission even in the case where the sensor devices 830 and 832 are not attached to the corresponding facilities, they can retransmit the received IR signal. In the related art, each sensor device is not provided with a list of other sensor devices, and thus the signal that is received in the above-described signal transmission process should be retransmitted to the other sensor devices. According to an embodiment of the present disclosure, each sensor is provided with a list of other sensor devices, and thus unnecessary retransmission of the signal can be reduced.

Figure 9:
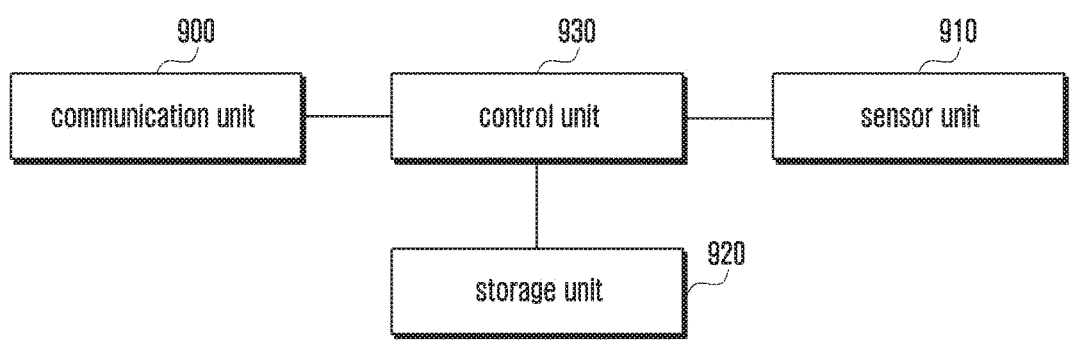
FIG. 9 is a block diagram illustrating an internal configuration of a sensor device according to an embodiment of the present disclosure.

FIG. 9 is a block diagram illustrating an internal configuration of a sensor device according to an embodiment of the present disclosure.

Referring to FIG. 9, more specifically, the sensor device of FIG. 9 may include a communication unit 900, a sensor unit 910, a storage unit 920, and a control unit 930.

The communication unit 900 may transmit/receive information that is necessary for facility control with facilities and a gateway. The communication unit 900 may include an IR signal transceiver. The communication unit 900 may receive an IR signal from a remote control device of a facility, and transmit the IR signal to the facility. Further, the communication unit 900 of the sensor device may transmit/receive the IR signal with two or more other sensor devices. Further, the communication unit 900 may include a communication module related to NFC. Specifically, the communication unit may include a Bluetooth module, a WI-FI module, a WI-FI-Direct module, a Zigbee module, or an NFC module. The communication unit 900 may communicate with the gateway according to an embodiment of the present disclosure using the wireless communication module.

The sensor unit 910 may include at least one sensor for detecting elements that are changed through an operation of the facility. More specifically, the sensor unit 910 may include at least one of a temperature sensor, an approach detecting sensor, a humidity sensor, an illumination sensor, and a vibration detecting sensor. The sensor unit 910 may transmit signals that are detected by the plurality of sensors to the control unit. The sensor unit 910 may drive the sensors through reception of sensor drive information from the control unit. For example, the sensor unit 910 may drive only parts of the sensors based on an on-signal from the controller, and may drive the parts of the sensors in a certain order.

The storage unit 920 may store necessary information of the sensor device according to an embodiment of the present disclosure. First, the storage unit 920 may store authority information that is received from a terminal or a gateway. Further, the storage unit 920 may store a determination table for determining the kind of a facility to which the sensor device is attached. The determination table may be received from a server according to an embodiment of the present disclosure through the gateway or from an external server that is connected to the gateway. Further, the storage unit 920 may store a list of facility devices based on facility-related information and service information received from other sensor devices. Further, the storage unit 920 may transmit the stored information to the control unit 930.

The control unit 930 may control receiving the facility-related information from a remote control device of the facility to which the sensor device is attached, driving at least one sensor determined according to the facility-related information, determining the kind of the facility based on the detecting result of the at least one sensor being driven, and transmitting a registration request of the facility of which the kind is determined to the gateway.

Further, the control unit 930 may further control, before the receiving, receiving information on the terminal, requesting a connection from the gateway based on the authority information, and receiving a connection completion message in response to the connection request from the gateway. The control unit 930 may further control receiving at least one of facility information or position information from a sensor that is attached to at least another facility, preparing a facility list in an area based on the received information, and in the case of receiving a control signal from the terminal, retransmitting a received signal to at least the other sensor based on the facility list.

Figure 10:
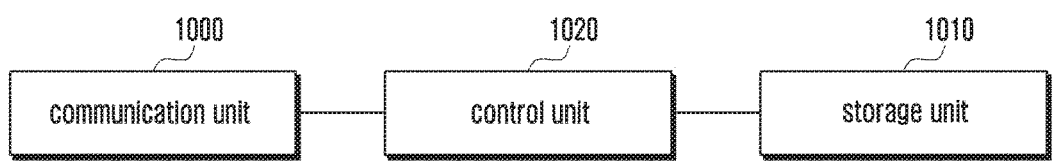
FIG. 10 is a block diagram illustrating an internal configuration of a gateway according to an embodiment of the present disclosure.

FIG. 10 is a block diagram illustrating an internal configuration of a gateway according to an embodiment of the present disclosure.

Referring to FIG. 10, more specifically, the gateway according to an embodiment of the present disclosure may include a communication unit 1000, a storage unit 1010, and a control unit 1020.

The communication unit 1000 may transmit/receive signals with a mobile communication network to which a server, a sensor device, and a terminal is connected. The communication unit 1000 may include a wired communication unit and a wireless communication unit. First, the communication unit 1000 may communicate with the server through the wired communication unit. The communication unit 1000 may transmit an authentication request for a terminal or a server device to the server, and receive a response thereto.

Further, the communication unit 1000 may include a wireless communication unit. The wireless communication unit may include both a communication module that corresponds to NFC and a communication module for mobile communication. The communication module that corresponds to an NFC module may include a Bluetooth module, a WI-FI module, a WI-FI-Direct module, a Zigbee module, or an NFC module. Further, the communication unit 1000 may further include an RF transmitter up-converting and amplifying a frequency of a transmitted signal for making the mobile communication possible, and an RF receiver low-noise-amplifying the received signal and down-converting the frequency of the signal.

The communication unit 1000 may communicate with a sensor device attached to the facility and the terminal using NFC. For example, the communication unit 1000 may receive a signal related to gateway registration of the sensor device, and transmit a signal related to facility control to the sensor device. Further, the communication unit 1000 may receive a signal that is necessary in a registration process of the terminal. The communication unit 1000 may transmit and store the received information in the storage unit 1010 or transmit the received information to the control unit 1020.

Further, the storage unit 1010 may store necessary information of the gateway operation. The storage unit 1010 may receive and store facility-related information of the facility to which the sensor device is attached. Further, the storage unit 1010 may store status information of the facility stored in the gateway based on the facility-related information that is received from the respective sensor devices. Further, the storage unit 1010 may store information on facilities in a common area. The storage unit 1010 may receive an information request of the control unit 1020, and transmit information that is requested by the control unit 1020 to the control unit 1020.

The control unit 1020 may control receiving a connection request from the sensor, transmit a connection completion message if the authority information is included in the connection request, receive and register a facility registration request from the connected sensor, and receive a control command of the registered facility from the terminal including the authority information. Further, the connection request may be transmitted based on a distance between the terminal pre-authenticated in the server and the gateway.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a sensor device included in a facility and configured to support at least one facility control by a terminal, the method comprising:
   receiving, by the sensor device including a plurality of sensors, facility-related information from a remote control device of the facility;
   selecting, by the sensor device, at least one sensor among the plurality of sensors, based on the received facility-related information and a table including information on the plurality of sensors associated with each type of the at least one facility;
   determining, by the sensor device, a type of the facility based on a result of detection by the at least one sensor; and
   transmitting, by the sensor device, a registration request for the facility including information on the type to a gateway.

2. The method of claim 1, further comprising:
   receiving, before the receiving of the facility-related information from the remote control device of the facility, authority information from the terminal;
   transmitting a connection request to the gateway based on the authority information; and
   receiving a connection completion message in response to the connection request from the gateway.

3. The method of claim 1,
   wherein the table further includes weight information for each of the plurality of sensors associated with each type of the at least one facility, and
   wherein the selecting of the at least one sensor is further based on the weight information.

4. The method of claim 1, wherein the selecting of the at least one sensor comprises:
   determining, if the facility-related information includes facility-related information on at least another facility, that the at least one sensor corresponds to the facility and the at least another facility; and
   determining a driving order of the at least one sensor.

5. The method of claim 4, wherein the determining of the driving order of the at least one sensor comprises determining the driving order based on a degree of redundancy between sensors corresponding to the facility and sensors corresponding to the at least another facility.

6. The method of claim 1, further comprising:
   receiving at least one of facility information or position information from the at least one sensor attached to at least another facility;
   transmitting the received information to the gateway; and
   receiving a facility list associated with the at least another facility from the gateway.

7. A method of a gateway to support at least one facility control by a terminal, the method comprising:
   receiving a connection request from a sensor device including a plurality of sensors;
   transmitting, to the sensor device, if authority information is included in the connection request, a connection completion message to connect with the sensor device;
   registering a facility associated with the sensor device based on a facility registration request received from the connected sensor device; and
   receiving a control command, including the authority information, for the registered facility from a terminal,
   wherein the facility registration request includes information on a type of the facility determined, by the sensor device, based on facility-related information and a table including information on the plurality of sensors associated with each type of the at least one facility, and
   wherein the facility-related information is received by the sensor device from a remote control device of the facility.

8. A sensor device including a plurality of sensors and included in a facility that supports at least one facility control by a terminal, the sensor device comprising:
   a transceiver configured to transmit/receive a signal with a gateway and a facility; and
   at least one processor configured to:
      control the transceiver to receive facility-related information from a remote control device of the facility,
      select at least one sensor among the plurality of sensors included in the sensor device based on the received facility-related information and a table including information on the plurality of sensors associated with each type of the at least one facility,
      determine a type of the facility based on a result of detection by the at least one driven sensor, and
      control the transceiver to transmit a registration request for the facility including information on the type to the gateway.

9. The sensor device of claim 8, wherein the at least one processor is further configured to, before the receiving of the facility-related information from a remote control device of the facility:
   control the transceiver to receive authority information from the terminal, to transmit a connection request to the gateway based on the authority information, and to receive a connection completion message in response to the connection request from the gateway.

10. The sensor device of claim 8,
    wherein the table further includes weight information for each of the plurality of sensors associated with each type of the at least one facility, and
    wherein the selection of the at least one sensor is based on the weight information.

11. The sensor device of claim 8, wherein the at least one processor is further configured to:
    determine, if the facility-related information includes facility-related information on at least another facility, the at least one sensor corresponding to the facility and the at least another facility, and
    determine a driving order of the at least one sensor.

12. The sensor device of claim 11, wherein the at least one processor is further configured to determine the driving order based on a degree of redundancy between sensors corresponding to the facility and sensors corresponding to the at least another facility.

13. The sensor device of claim 8, wherein the at least one processor is further configured to control the transceiver to:
    receive at least one of facility information or position information from the sensor attached to at least another facility,
    transmit the received information to the gateway, and
    receive a facility list associated with at least another facility from the gateway.

14. A gateway that supports at least one facility control by a terminal, the gateway comprising:
- a transceiver configured to transmit/receive a signal with a sensor device and a server; and
- at least one processor configured to:
  - control the transceiver to receive a connection request from the sensor device including a plurality of sensors,
  - control the transceiver to transmit, to the sensor device, a connection completion message if authority information is included in the connection request to connect with the sensor device,
  - register a facility associated with the sensor device based on a facility registration request received from the connected sensor device, and
  - control the transceiver to receive a control command, including the authority information, for the registered facility from a terminal,
- wherein the facility registration request includes information on a type of the facility determined, by the sensor device, based on facility-related information and a table including information on the plurality of sensors associated with each type of the at least one facility, and
- wherein the facility-related information is received by the sensor device from a remote control device of the facility.

* * * * *